Oct. 12, 1965     M. J. WIGGINS ETAL     3,212,014
MAXIMUM LIKELIHOOD DETECTOR Filed Feb. 6, 1962                                         5 Sheets-Sheet 1

INVENTORS
MACDONALD J. WIGGINS
LOWDY CLIFTON LAYFIELD

BY *Julian C. Renfro* ATTORNEY

INVENTORS:
MACDONALD J. WIGGINS
LOWDY CLIFTON LAYFIELD

BY Julian C. Renfro
ATTORNEY

United States Patent Office 3,212,014
Patented Oct. 12, 1965

3,212,014
MAXIMUM LIKELIHOOD DETECTOR
Macdonald J. Wiggins and Lowdy Clifton Layfield, Orange County, Fla., assignors to Martin-Marietta Corporation, Middle River, Md., a corporation of Maryland
Filed Feb. 6, 1962, Ser. No. 171,494
14 Claims. (Cl. 329—107)

This invention relates to a radio pulse detection and demodulation system suitable for use in pulse position modulation radio communications, and more particularly to a detector that advantageously separates intelligence from background noise and crosstalk, this being accomplished by virtue of the higher amplitude of the correct pulses. The time of arrival of such higher amplitude pulses is identified with respect to a time reference arrangement, and this time of arrival is translated into a train of pulses regularly spaced in time whose amplitude is proportional to such arrival times, thus effectively recreating the intelligence contained in the incoming time-position varying pulses.

One of the operating principles of pulse communication systems is that if an intelligence signal is sampled at regular intervals, the resulting signal will still retain substantially all of the useful information present in the original signal, provided that the sampling frequency is at a rate equal to at least twice as high as the highest useful frequency in the original signal. In other words, the intelligence may be reproduced substantially in its original form if the sampling period is equal to approximately one-half the period of the highest frequency of the original wave. This principle is known as the Nyquist sampling theorem. For example, in the case of an audio wave which has been passed through a filter having a cutoff frequency of approximately 3500 cycles, then substantially all of the audio information in the wave is present in a series of samples of the wave taken at a 7.8 kc. rate.

In prior art pulses modulation communication systems, threshold devices have been utilized to detect the presence of a pulse at the receiver. In such systems the threshold devices will indicate the presence of all pulses having energy above the threshold level without regard to the origin of such pulses. Accordingly, pulses due to noise or inteference, or crosstalk pulses from other signal channels may accompany the intelligence pulses at the output of the threshold device. Such incorrect decisions are usually reduced by raising the threshold to a higher level, but unfortunately this procedure increases the number of deletions of correct pulses. These errors, which are known as false alarm and miss errors, respectively, cause distortion and noise in the demodulated signals, thus limiting the usefulness of the pulse communication system. Further, a threshold pulse detector must be followed by a device that serves to convert to an analog amplitude the time of arrival of the pulse with respect to the beginning of the sample.

According to the present invention, we take a radio frequency signal consisting of intelligence bearing pulses contaminated by noise and interfering crosstalk pulses, identify and extract the intelligence bearing pulses, and perform thereupon the first step in removing intelligence from latter pulses. In so doing, this invention therefore reproduces the transmitted or video signal present at a certain stage of the modulation process in the transmitter.

This is advantageously accomplished in this invention by identifying the correct pulse by virtue of the higher amplitude of the correct pulse, and identifying the time of arrival of the correct pulse with respect to a certain reference period. This time of arrival is in turn translated into a voltage proportional to such time of arrival, which voltages are held from one time reference until the next, at which time the newer such voltage level replaces the previously held voltage level. These time references occur at the beginning of each sample period, such period being determined by the modulation system employed at the transmitter, chosen to satisfy the Nyquist sampling theorem.

The goals of this invention are accomplished by the use of a unique storage concept according to which incoming pulses are stored for the duration of a sample period, with a decision being made at the end of this sample period as to which was in fact the correct pulse received during the sample period. This decision is not made on the basis of a threshold, but rather is based upon the previously-mentioned premise that from a comparison of all pulses received during the sample period, the correct pulse can be identified by its higher amplitude. Then at the end of the reference period, a voltage proportional to such time of arrival is generated and transferred to a readout storage device. After such readout of voltage, the storage device holds this voltage until the end of the next succeeding sample period, at which time a voltage corresponding to the time of arrival of the highest amplitude pulse in this succeeding sample period replaces the previously held voltage, even though the voltage of the succeeding sample period be less. Thus a succession of sample periods will produce an increasing and decreasing staircase type waveform which is a reproduction of the original or video signal at the transmitter taken at a particular point in the original modulation process. Appropriate circuitry is then employed to process this staircase-like waveform, to reproduce an exact duplicate of the original audio or video signal which occurred at the input of the transmitter.

Numerous important advantages flow as a result of this storage technique, a principal one of these being that the present invention has the unique capability of not being required to make a decision at the instant a pulse is recognized, but rather enables this decision to be deferred until the end of a certain time period, so that the probability can be greatly increased that a correct decision will be made.

This invention advantageously may be employed either in conjunction with a quantized PPM system or a non-quantized PPM system. An inherent feature of this invention is the providing of a timing means which locates the time of arrival of the correct pulse. For continuously varying PPM pulses a continuous time reference can be employed, whereas for quantized PPM pulses, either a continuous time reference or a time reference which changes in discrete time-steps matching the quantization time-steps of the incoming quantized PPM pulses can be employed.

Significantly, the discrete step-type time reference can also be used with a continuous PPM signal when it is necessary or desirable to convert such continuous PPM pulses into quantized PAM signals; such as at the interface of radio relay systems where the incoming signal is non-quantized and the outgoing signal is to be quantized.

Our invention finds special application with a unique, recently developed pulse-type signalling system utilizing the tropospheric scatter medium in which a multiple time-frequency coding scheme is used to implement a time-division multiplexing method. A patent application on such invention was filed in the names of McKay Goode and Macdonald J. Wiggins on April 12, 1962, Serial No. 186,912, and is assigned to the assignee of the present invention. In this system, each signal pulse is divided into five subpulses wherein each subpulse is transmitted by means of a different time slot-frequency combination. In order to obtain a maximum system loading, the multiplex channels share a maximum of one time-frequency combination between any pair of such multiplex channels. The pulse stream from the receiver decoder summer will consist of the correct pulse composed of the sum of the five subpulses occurring at the times corresponding to the PPM process at the transmitter and randomly-occurring crosstalk pulses from random combinations of subpulses from other multiplex channels. The probability is very high that the random combinations of such subpulses plus noise energy will be of a lesser amplitude than the coherent combination of the correct subpulses. This invention makes possible the practical application of such a pulse-type signalling system by reducing to a negligible value the errors and voice-distortion due to such crosstalk.

Accordingly, it is an object of this invention to provide a demodulator of an improved type, utilized in a pulse position modulation radio system for detecting the transmitted pulse in a time interval containing noise and interferring crosstalk pulses, and for identifying the time of arrival of such transmitted pulse with reference to the beginning of the time period representing a sampling period of the original audio or video signal.

Another object of this invention is to provide a device for producing an output signal which is a succession of voltage levels whose amplitudes are proportional to the time of arrival of the correct transmitted pulses with reference to the beginning of the time period which represents a sampling period of the original audio or video signal; such output signal being a reconstruction of the original audio or video signal.

Still another object of this invention is to provide a device which will enable in a radio frequency pulse communication system the use of multiplexing methods which achieve higher density of separate channels in a given spectrum bandwidth than heretofore possible, this high density being achieved by dividing the basic pulses into subpulses and allowing overlapping or sharing of subpulses between such separate channels, wherein crosstalk pulses arising from this sharing are of smaller energy or amplitude than the correct channel pulse.

These and other objects, features, and advantages of this invention will be more apparent from a study of the enclosed drawings in which.

Figure 1:
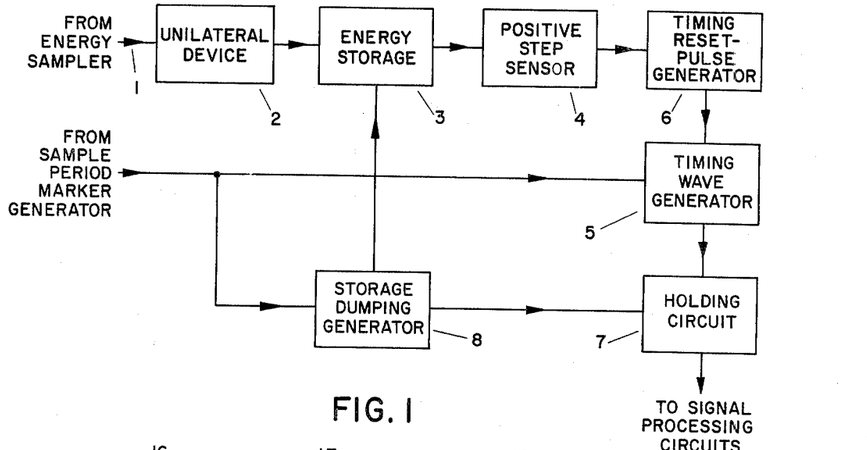
FIGURE 1 is an exemplary functional diagram of our invention.

Referring to FIGURE 1, a train of pulses which may vary in amplitude and contain noise may emanate from an energy sampler which integrates the energy during signal pulse duration. The output from the energy sampler is in the form of a pulse whose voltage amplitude is proportional to the pulse energy.

Figure 2:
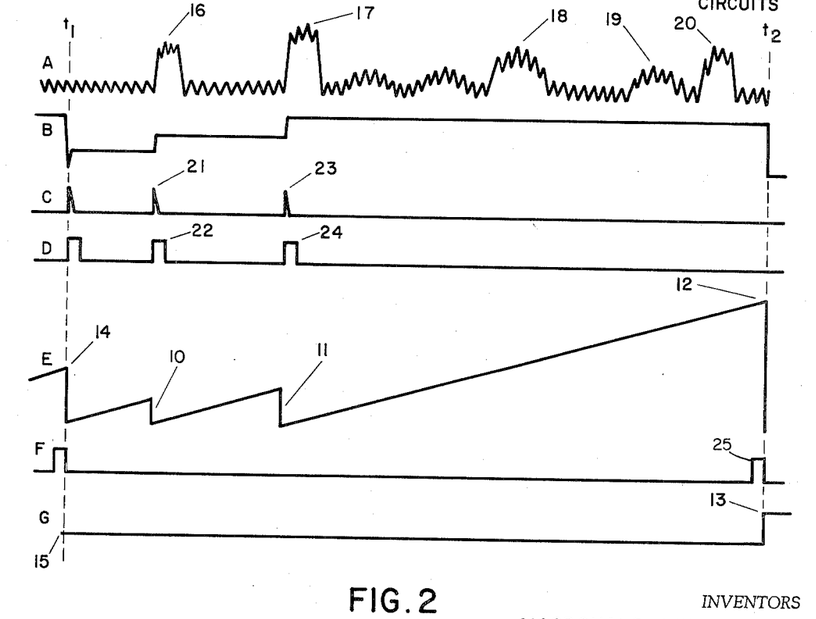
FIGURE 2 is a waveform diagram representing the waveforms present at certain specific locations in FIGURE 1.

This train of pulses appearing on input 1 is depicted in Line A of FIGURE 2, and these pulses are supplied to a unilateral device 2 which passes only positive-going signals. While a diode is admirably suited for this purpose, it is within the spirit of this invention to use any two terminal unilateral devices which will conduct with low signal attenuation with a positive voltage gradient across its terminals, and which will not conduct when a negative voltage gradient is across its terminals.

The train of pulses passed by device 2 is received by energy storage circuit 3. The energy in the energy storage circuit 3 will increase only when the pulse voltage amplitude is greater than the voltage in the storage circuit by virtue of the fact that otherwise a negative voltage gradient across terminals of device 2 will be present. FIGURE 2 reveals a sample period from $t_1$ to $t_2$ which may for example be 128 microseconds. As a result of first pulse 16 of this sample period, which is shown on Line A, the voltage level in storage circuit 3 steps to a higher value, as indicated in Line B. This causes the positive step sensor 4 to produce an impulse as shown at 21 in Line C, which represents the output of the positive step sensor 4.

The impulse 21 from positive step sensor 4 triggers a reset pulse 22 from the timing reset-pulse generator 6, the output of which is shown on Line D. In the meantime the timing wave generator 5 has begun generating a timing wave at $t_1$, as shown on Line E, this timing wave having been reset (by a reset pulse from an external sample period marker generator) from the value shown at 14, which represented the value of timing wave output for a preceding sample period, as will hereinafter be described.

The reset pulse 22 representing the pulse 16 now serves to reset the timing wave generator 5 to zero output voltage as shown at 10 on Line E. From a zero level the output of timing wave generator 5 begins to increase again in a predetermined fashion.

For example, the manner in which the timing wave generator 5 output increases may be linear if a linear reproduction of a continuous pulse-position modulated signal is desired, or it can be a stairstep waveform in which each voltage step is the same if a linear reproduction of a quantized pulse-position modulated signal is desired.

The linear timing wave of Line E continues to increase until such time as a larger pulse 17 arrives at unilateral device 2 from the energy sampler, this occurring in the same sample period $t_1-t_2$. This new maximum pulse of the sample period causes a higher step to be taken by the energy storage device 3, and this in turn produces a pulse 23 which in turn triggers another pulse from the timing reset-pulse generator 6, which pulse is shown at 24. This in turn causes the timing wave generator 5 to be reset, as shown at 11 in Line E.

Subsequent pulses 18, 19 and 20 from the energy sampler do not affect the energy storage circuit 3, since they produce only negative voltage gradients across device 2 so therefore the timing wave on Line E continues to increase from the time of pulse 17 until the end of the sample period, where it reaches its maximum value 12, which is a value inversely proportional to the time of arrival of desired pulse 17. In other words, this invention locates the time of arrival of a pulse with respect to the beginning of a sample period by causing a timing wave to start at the time of arrival of a pulse larger than any previously received in a time frame, and stopping the timing wave at the end of the sample period. Inasmuch as the voltage amplitude of the timing wave increases with time, either positively or negatively, its amplitude at the end of a sample period is inversely proportional to the time of arrival of the largest pulse during such period. Although a linearly increasing waveform as depicted in FIGURE 2 has many applications, a non-linear waveform may be used, as will be discussed hereinafter.

The sample period marker pulse 25 shown by Line F occurs at the time $t_2$ when the timing wave E is at its maximum 12 and in this embodiment the trailing edge of this pulse causes this maximum value to be stored in the holding circuit 7 as shown at 13 on Line G, but illustrated to a reduced scale. This level 13 in the holding circuit 7 is directly proportional to the original audio or video signal at the time of sampling. The level 15 in the holding circuit is that which was transferred from the timing generator 5 at the end of the preceding sample period. The trailing edge of marker pulse 25 serves to actuate the timing reset-pulse generator 6 and the storage dumping generator 8. The storage dumping generator 8 serves to remove the last stored pulse from energy storage 3 and prepare the energy storage 3 for the beginning of the next sample period.

In order to recover the audio or video signal present at the transmitter before sampling, the waveform generated by a succession of such levels in the holding circuit 7 is processed by means of low-pass filters which remove harmonics and reconstitute the original sampled wave in accordance with well-known sampling theory.

Figure 3:
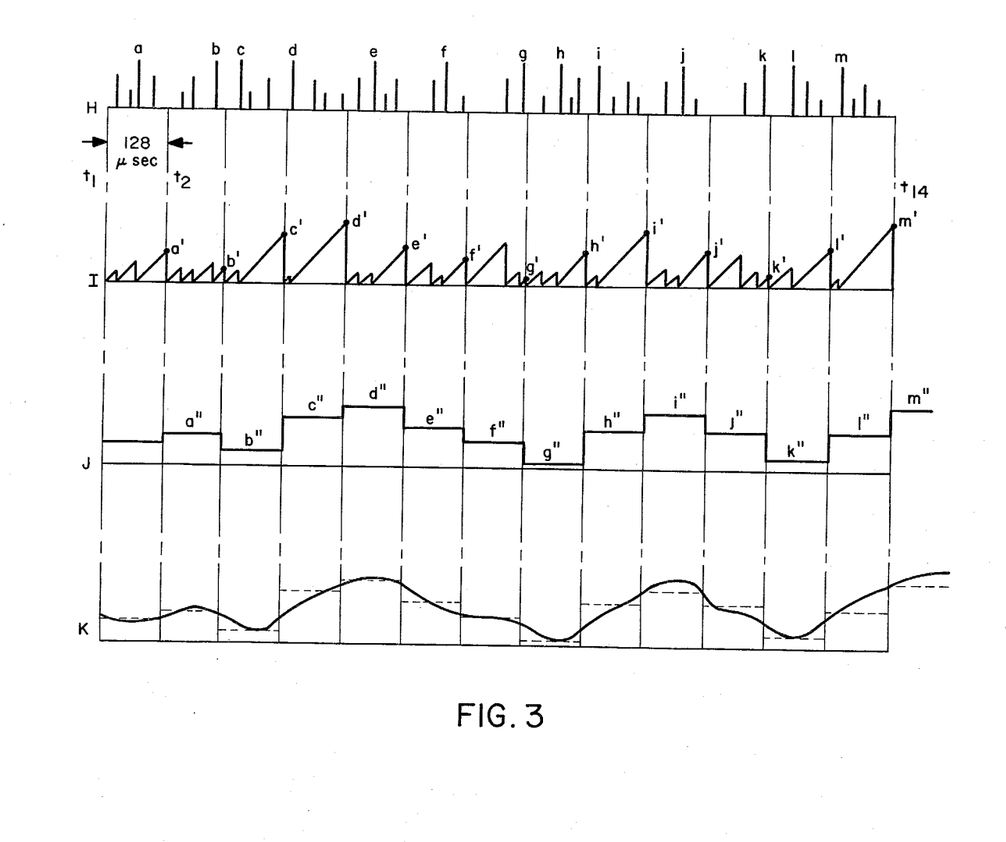
FIGURE 3 is a waveform diagram similar to FIGURE 2 but representing longer time periods in order to more fully depict a utilization of this invention.

Turning to FIGURE 3, Line H represents a succession of contiguous sample periods, each of these sample periods being of a time duration equal to the time period $t_1-t_2$ shown in FIGURE 2. In the 13 sample periods shown, the pulses illustrated have amplitudes proportional to the energy in various pulses entering the system. The pulses numbered from $a$ to $m$ are the "correct" pulses and have the highest amplitude in each 128 microseconds sample period. All other pulses are interfering or crosstalk pulses. These crosstalk pulses have very high probability of being of lesser amplitude than the desired pulses in certain applications for which this invention is useful.

Line I shows the waveform at the output of the timing wave generator, and it should be noted that the timing wave generator is reset at the time of arrival of each successively larger pulse in a sample period, and also at the end of each sample period. The levels $a'$ to $m'$ thus represent by means of voltage level the time of arrival of the corresponding pulses $a$ through $m$ on Line H.

At the end of each 128 microseconds period, the levels $a'$ through $m'$ on Line I are transferred to the holding circuit, and as depicted on Line J, the holding circuit maintains these levels, which are indicated by $a''$ through $m''$ through each succeeding sample period. As will be obvious to those skilled in the art, this succession of held levels shown on Line J are thus a reconstitution of the original sampled PPM audio or video signal. This waveform is then passed through a low pass filter (included in the signal processing circuits indicated in FIGURE 1) which removes the high frequency components generated in the sampling process, thus yielding the audio wave shown on Line K which represents the original audio or video signal.

It is noted that this invention will reconstruct the sampled audio or video waveform present at the transmitter prior to the pulse position modulation operation where the pulses arriving at the input of this invention are contaminated by noise and interfering crosstalk pulses which is a situation occurring in certain useful applications of this invention. There is no intention to limit the usefulness of this invention to such applications, since in fact, the invention is unique and useful for pulse position demodulation in any PPM system regardless of the presence of noise or interference.

In the present embodiment of the invention, the correct pulses arriving at the input are in one of 16 discrete time frames in one sample period. This configuration results from sampling voice waveforms once at the beginning of a sample period and quantizing the observed amplitude into one of 16 quantizing levels. Thus, each of the 16 time frames in a sample period represents one of those 16 quantizing levels. The transmission of these pulses may be through a medium where transmission characteristics are a random function of time. Each of the transmitted pulses may be subdivided into several sub-pulses and each sub-pulse transmitted on a different frequency in order to achieve a diversity characteristic to overcome the random variations of medium characteristics. In selecting and combining these sub-pulses, there may occur extraneous random sub-pulses from other simultaneous transmissions, such random sub-pulses being known as crosstalk pulses. For such a transmission scheme, the probability is very small that crosstalk pulses will combine to give as high an amplitude as the correct sub-pulses will combine to produce.

Therefore, there are also present pulses due to random thermal noise and due to crosstalk pulses whose amplitudes are also varying randomly with time and on a statistical basis, the correct pulse has the greatest amplitude although on an instantaneous basis, this may not always be true. The invention chooses the pulse which has the maximum likelihood of being the correct one. The invention is thus known as a maximum likelihood detector. Due to the discrete nature of the pulse position in time, the timing waveform of the present embodiment of the invention is a staircase waveform.

Figure 4:
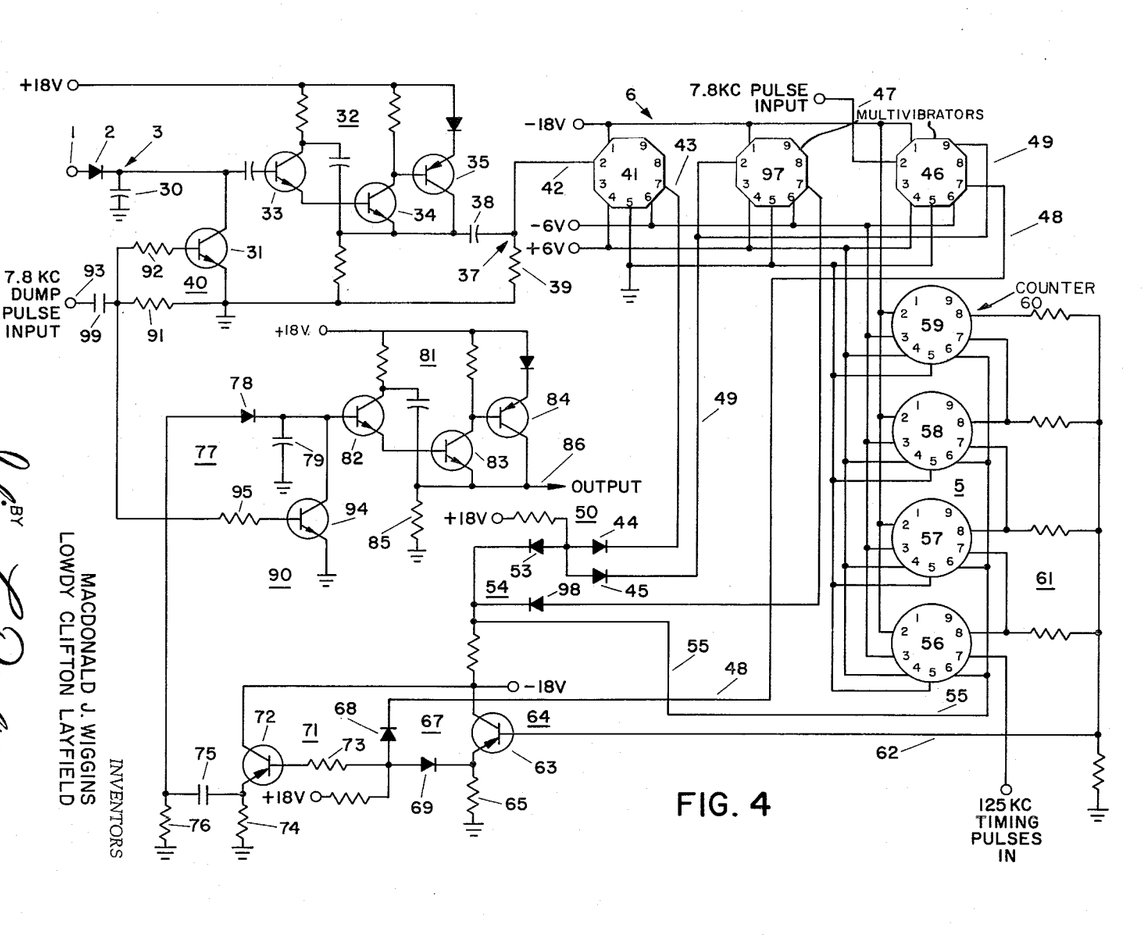
FIGURE 4 is a circuit diagram of a specific embodiment of our invention.

Referring to FIGURE 4, a train of pulses such as from an energy sampling integrator enter input terminal 1 of this device. These pulses pass through diode 2 to energy storage circuit 3 corresponding to Energy Storage 3 of FIGURE 1, which in FIGURE 4 may comprise a capacitor 30 which functions to hold or store the amplitude of each received pulse if the received pulse is larger in amplitude than a previous pulse occurring within the same sample period. In other words, capacitor 30 will assume a voltage charge equal to the amplitude of the first pulse received, and then as larger pulses are received during the sample period, the capacitor 30 will assume a voltage level equal to the amplitude of the largest pulse of the sample period while ignoring smaller amplitude pulses, this being accomplished inasmuch as the diode 2 will not form a conductive path when a higher positive voltage exists on the cathode of the diode resulting from the charge on capacitor 30. Therefore, at the end of the sample period, capacitor 30 will have a voltage charge equal to the amplitude of the largest pulse received during the sample period.

As will be seen in greater detail hereinafter, the transistor 31 serves to discharge capacitor 30 at the end of the sample period, this being necessary in order to prepare energy storage circuit 3 to receive the next sequence of pulses, due to arrive in the next sample period.

In order to prevent capacitor 30 from losing any significant portion of its charge during the sample period, it is desirable to utilize a high impedance between the energy storage circuit and positive step sensor 4 and to this end we prefer to use an emitter follower device 32 which comprises transistors 33, 34 and 35 as well as associated resistors, capacitors and diode, which device has the desirable characteristics of high input impedance. This emitter follower utilizes two transistors 33 and 34 in the well-known Darlington connection for increasing the input impedance over that of a one transistor type emitter follower.

An alternate manner of obtaining high input impedance may involve the use of a thermionic triode in a cathode follower circuit.

The output from emitter follower 32 drives a positive step sensor in the form of a differentiator 37, which comprises capacitor 38 and resistor 39. As each new larger pulse is received by the holding circuit 3, the positive going step of voltage on capacitor 30 is differentiated by differentiator 37 which supplies a sharp pulse to the input of the timing reset-pulse generator, which in this instance is a multivibrator 41 having an input 42. This multivibrator receives this spiked pulse and from it produces a 2 microsecond pulse on output 43 each time a pulse larger than all previous pulses of the sample period has been detected. This multivibrator is used inasmuch as the counters 56 through 59 constituting the timing wave generator have a 0.1 microsecond rise time requirement, which dictates the use of a fast rise time pulse of the type supplied by a multivibrator. Multivibrator 41 may be a device of the type marketed by the Walkirt Company of Inglewood, California, type PM7023, whereas the four stage binary counter 56–59 may employ binary counters of the type PM7823, manufactured by the same company. Schematic diagrams of the binary counter and multivibrator units are set forth in FIGURES 6 and 7, and in each instance the terminals of these components correspond to the related pin connection diagrams shown in FIGURE 4. Details of these units are set forth hereinafter.

As will be seen hereinafter each time the multivibrator 41 delivers such a pulse, this causes a resetting of the stairstep type timing wave supplied by the counter arrangement set forth in this embodiment.

Figure 5:
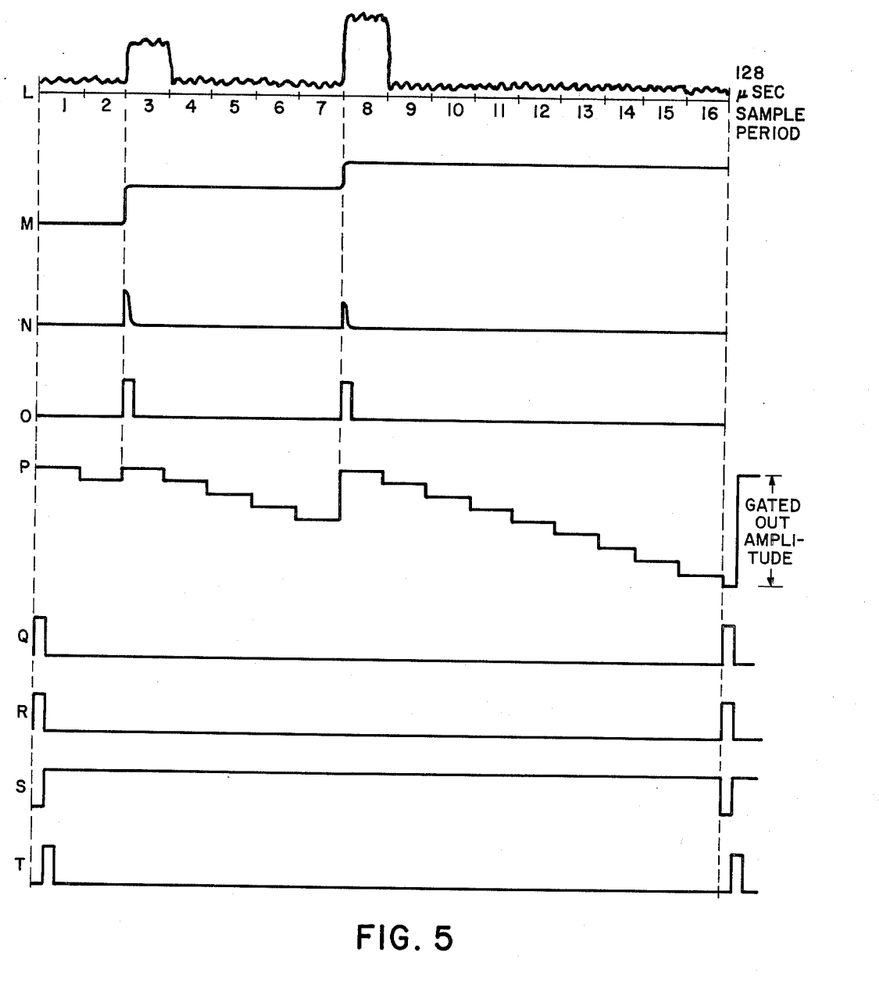
FIGURE 5 is a waveform diagram similar to FIGURE 2 but containing the waveforms that are relatable to the embodiment shown in FIGURE 4.

The foregoing description will perhaps be made more lucid by reference to FIGURE 5 wherein Line L represents a 16 time frame sample period in which two pulses appear. The 16 time frames are present when a 16 level quantized PPM system is utilized. These pulses are depicted in time frames 3 and 8 for the purpose of illustration, and represent successively larger pulses comparable to pulses 16 and 17 of FIGURE 2. The 16 time frames together constitute a sample period of 128 microseconds.

Line M of FIGURE 5 indicates the wave form that appears on capacitor 30 of holding circuit 3 for the events indicated on Line L, namely a sharp change of voltage that takes place on Line M from the base line as a result of the first pulse, and an additional upward voltage step occurring coincident with the larger pulse appearing on Line L. As described in conjunction with FIGURE 2, for each succeeding larger pulse occurring within the sample period, the wave form representing the charge on the capacitor of the holding circuit 3 will represent a corresponding upward step, with the largest voltage occurring within the sample period being maintained until the end of that sample period. The residual voltage level will then be read out into a holding circuit 77.

Line N represents the output wave form of the RC combination 37 under the previously described conditions, namely, each time a voltage step occurs as indicated on Line M. Each output pulse on Line N is delivered to multivibrator 41 which in turn delivers a broadened pulse as depicted on Line O, which pulse, as previously mentioned, may be of two microseconds duration.

Line P of FIGURE 5 represents the stairstep waveform as may be produced by the counter configuration herein employed as the timing wave generator. Inputs to this generator are connected to counter 56, which may receive 125 kc. square waves from an external timing source on one of its inputs, and receive on another input the reset commands on lead 55 as discussed at length hereinafter. Counter 56 is connected to counter 57 and since each counter inherently divides its input by 2, the input to counter 57 will be one-half of 125 kc. or 62.5 kc. Counter 57 is in turn connected to counter 58 so latter counter has an input that is one-fourth of 125 kc. whereas the connection of counter 58 to counter 59 causes latter counter to have an input one-eighth of 125 kc.

The staircase was chosen in order to give very high accuracy of the voltage steps and because in this particular embodiment an accurate 125 kc. timing source was available externally. In a utilization of this invention wherein the requirements as to accuracy of the voltage steps are less stringent than the pulse type system to which this invention is applied, and in instances in which such timing pulses are not available externally, it should be noted that a linear timing waveform as described in conjunction with FIGURE 2 is equally applicable to the quantized PPM system and usually represents simpler circuits.

The output of each counter is delivered to summing network 61 and because of the different frequencies and different weights assigned to each frequency, a 16-step staircase voltage waveform is thereby created. Thus it is to be seen that with the 125 kc. input, this counter arrangement has created steps 8 microseconds wide, with 16 steps of this width defining a sample period of 128 microseconds.

Therefore, if a reset pulse is not sent to the counters during a sample period, a 16-step continuous staircase waveform corresponding to the 16 time frames of the sample period would be produced by this arrangement. However, as described at some length hereinafter, the counting is caused to start a new each time a maximum pulse is received during the sample period by the detector, so as depicted in Line P, the stairstep waveform recommences from its base line with each of the reset pulses of Line O.

Returning to FIGURE 4, multivibrator 46 performs the important functions of readout and reset and is closely associated with the dump function. It is of course imperative that these functions be performed in proper order to prevent loss of vital information. Input 47 of multivibrator 46 receives input pulses at a repetition rate in this instance of 7.8 kc., this being exactly the reciprocal of 128 microseconds. This timing is received from an external timing source and from the multivibrator 46 supplies an undelayed output on output 48 and a delayed output on output 49. On lead 48 a binary ONE is delivered to AND gate 67 to bring about the gating out of the binary counters at the end of a sample period, and this multivibrator delivers a binary ZERO for the last two microseconds of the sample period to prevent reset of the counter before readout. In other words, the undelayed output of two microseconds wide timing pulses is delivered to AND gate 67, which gate controls the readout of timing wave generator 5 (which comprises counter 60 and summing network 61), whereas the delayed output 49 of multivibrator 46 is delivered to AND gate 50 to insure that no resetting of the counters can take place during readout. Line Q represents the 7.8 kc. input to multivibrator 46 (as well as the dump pulse for discharging the capacitors of holding circuits 3 and 77) with the leading edges of the pulses of Line Q defining the 128 microsecond sample period of this embodiment. Line R depicts the undelayed pulses supplied at output 48 of multivibrator 46, with the positive-going leading edge of each of these pulses causing at AND gate 67 the timing wave generators to be gated out at the right time, whereas output 49 of multivibrator 46 has a complementary output of two microseconds-wide pulses as indicated on Line S. Since latter pulses are negative instead of positive, the positive-going portion of each pulse of Line S occurs 2 microseconds after positive going portions of the pulses of Line R. Therefore, created on Line S is a very "wide" waveform some 126 microseconds wide, during which time the counters can be restarted in response to pulses passing through AND gate 50 as a result of a new maximum pulse received during the sample period. Line T represents the output of multivibrator 97, the pulses of which cause a reset of the counters at the end of each successive sample period, as will be hereinafter described.

Returning to multivibrator 41, the two-microseconds-wide pulses appearing at its output 43 are delivered to diode 44 of AND gate 50. The delayed output 49 from multivibrator 46 is connected to diode 45 of AND gate 50, this gate thus bringing together the input information based upon the occurrence of a maximum amplitude pulse occurring within a 128 microsecond sampling period, and the delayed timing pulses from multivibrator 46 which are, of course, based upon the 7.8 kc. pulses from the independent timing source. Whenever the pulses from multivibrator 41 (FIGURE 5, Line O) coincide with the wide positive pulses from multivibrator 46 (FIGURE 5, Line S), as is usually the case, a pulse will be passed by AND gate 50 to diode 53 of OR gate 54. Since any pulse appearing on an OR gate input will appear on the output thereof, the pulse will pass via lead 55 to each of counter units 56–59 of the four stage binary counter 60 to cause it to reset in the manner shown in Line P. However if a pulse from multivibrator 41 coincides with the negative pulse appearing at the end of Line S, no reset of the counters can take place. In this manner the resetting of the counters is prevented from occurring during readout, inasmuch as this negative pulse in effect represents the time that AND gate 67 is gating out the counters as a result of the pulse from undelayed output 48; not the right end of Lines R and S.

The output of each counter unit is delivered to summing network 61, and because of the different frequencies and the different weights assigned to each frequency, a 16 step staircase voltage waveform is created, as hereinbefore mentioned. Thus it is to be seen that with the 125 kc. input, the counters 56–59 have created steps 8 microseconds wide (the reciprocal of 125 kc. is 8 microseconds), with 16 steps of this width defining a sample period of 128 microseconds.

The output of summer 61 is delivered via lead 62 to the base of transistor 63 of emitter follower 64, this being used for impedance matching purposes. The collector of transistor 63 receives a supply voltage of, for example, −18 volts from an external supply, whereas the emitter of this transistor is connected to a resistor 65 which serves as the load resistor. The voltage in the summing network 61, which is increasing negatively in discrete voltage steps as described before, is transferred to load resistor 65. Thus the emitter follower 64 supplies the stairstep waveform to AND gate 67, which is constituted by diodes 68 and 69. Diode 68 receives the undelayed readout pulses from output 48 of multivibrator 46, and these pulses cause the discrete voltage level last delivered from the counters to diode 69 to be gated out at the end of each sampling period as a measure of the time of arrival of the maximum amplitude pulse at input 1 during that sample period.

The voltage level represented by the amplitude of the airstep at the end of the sampling period therefore is gated out to emitter follower 71, used for impedance matching purposes, latter device being principally composed of transistor 72, and base and emitter resistors 73 and 74. From emitter follower 71 the signal is routed through capacitor 75, which reclamps the negative signals to ground level. This is necessary because holding circuit 77 will pass only positive pulses. Resistor 76 provides a discharge path for capacitor 75.

The holding circuit 77 comprises a diode 78 and capacitor 79 and serves to maintain constant voltage until such time as the storage dumping generator pulse indicating the end of a sample period arrives from an external source at the Dump Pulse Input 93. It is within the spirit of this invention to use any such circuit which will hold the voltage of the gated out pulses nearly constant. For usual applications the voltage may decay in a gradual fashion to a degree which introduces less than five percent distortion in the final processed voice or video signal. It will be noted that for a time duration of several sample periods the input to holding circuit 77 will be a serial chain of pulses whose amplitudes represent the time frame in which the maximum amplitude pulses occurred, therefore serving to convert the pulse position modulation to pulse amplitude modulation. These pulses will have widths of 2 microseconds and be spaced 128 microseconds apart. It is the purpose of holding circuit 77 to smooth in the open areas to facilitate filtering in the audio circuits.

From holding circuit 77 the signal is sent to emitter follower 81, which is of the same nature as emitter follower 32, and utilizes transistors 82, 83, and 84, which offers a high impedance to capacitor 79 to minimize its discharge during the sample period. The base of transistor 82 is arranged to receive from holding circuit 77 the pulse whose amplitude is proportional to the frame of the sample period which contained the maximum pulse. The output of emitter follower 81 taken across load resistor 85 is then sent out on output 86 to the audio circuits for reconstruction of the speech wave.

Thus it will be seen that at the end of each sample period, the residual voltage remaining in Line P of FIGURE 5 will be a measure of the time frame which contained the largest amplitude pulse within the particular sample period, and for a time duration of several sample periods it can be seen that these held voltage levels will appear as an increasing and decreasing staircase-like waveform such as depicted in Line K of FIGURE 3.

A dump circuit arrangement is employed to rapidly discharge capacitor 79 immediately prior to receiving the next gated output pulse from the counters, and to discharge capacitor 30 at the end of each sample period Dump circuit 90 for capacitor 79 principally comprises transistor 94 and resistor 95. Upon the receipt by the base of transistor 94 of a dump pulse from Dump Pulse Input 93, transistor 94 commences conduction and discharges capacitor 79 which capacitor has been storing the voltage level representative of the gated out voltage level from the counters. It is important to realize that this dump circuit will enable capacitor 79 to assume the correct charge representative of the next sample period involved, so that this capacitor can serve to smooth out the otherwise empty spaces that would occur between successive levels.

As previously mentioned, capacitor 30 must be discharged at the end of each sample period so as to enable it to again be charged to the extent necessary to reflect the maximum pulses occurring in the next sample period and to this end a dump circuit 40 is provided that is much on the order of dump circuit 90, and also operated from the same Dump Pulse Input 93. Dump circuit 90 principally comprises transistor 31 mentioned much earlier herein, and resistor 92. Transistor 31 is normally nonconducting and therefore an open circuit, but when the base of this circuit receives a dump pulse, the transistor immediately commences conduction and becomes a short circuit and causes a discharge of capacitor 30.

Resistor 91 and capacitor 99 are provided to differentiate the dump pulse input. This is because such input may be 8 microseconds wide, which is differentiated to provide a narrower, and hence much more satisfactory input to the bases of the transistors accomplishing the dump function.

Multivibrator 97 serves a function necessary to the successful operation of the maximum likelihood detector in the following manner. It is essential that the four stage binary counter be reset at the end of every sample period, and to accomplish this function, this multivibrator is employed. Multivibrator 97 receives as its input the delayed output 49 of multivibrator 46. Multivibrator 97 presents a two microsecond delay, and routes a delayed pulse to diode 98 of OR gate 54. Diode 44 of this gate has of course been receiving the output of AND gate 50 representative of new maximum pulses. Thus, the inclusion of multivibrator 97 performs the necessary function of resetting the four stage counter at the end of each successive sample period.

Figure 6:
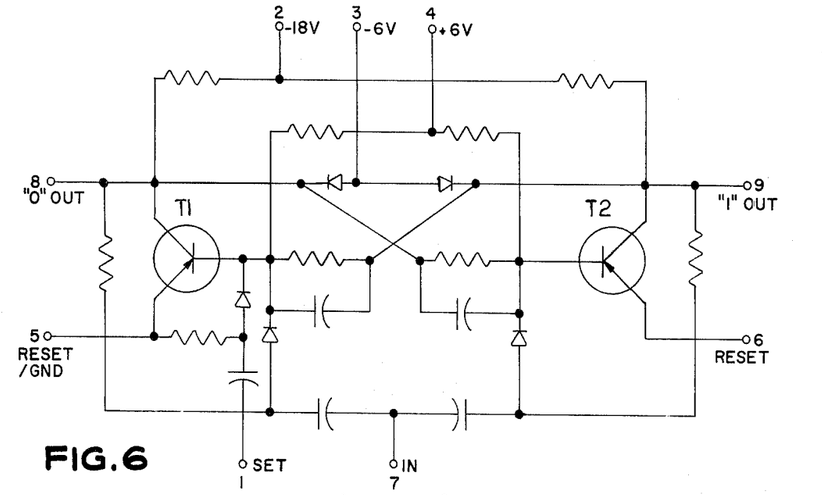
FIGURE 6 is a schematic diagram of a binary counter unit of the type used in the counter of FIGURE 4, with the numbered terminals of this unit corresponding to the pin connections of the counter units shown in FIGURE 4.
Figure 7:
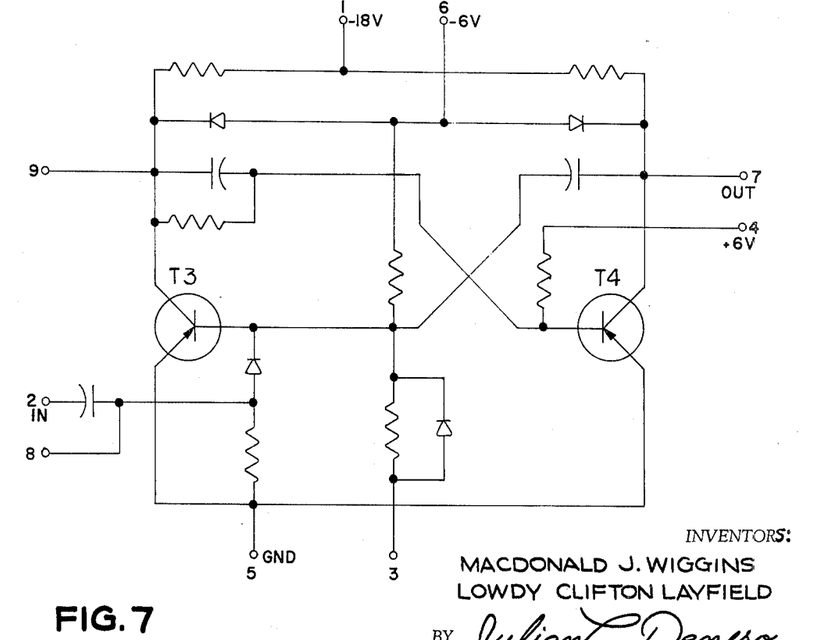
FIGURE 7 is a schematic diagram of a multivibrator of the type used in FIGURE 4, with the numbered terminals thereof corresponding to the pin connections of the multivibrators shown in FIGURE 4.

As to the details of FIGURES 6 and 7, the binary counter unit shown in FIGURE 6 is in essence a bistable multivibrator, the operation of which is well known in the art. A positive input pulse on pin 7 of the circuit shown in FIGURE 6 causes the binary circuit to change state such that one transistor is saturated and the other transistor is cut off. The next positive input pulse in pin 7 causes the binary circuit to switch to the other state; i.e., the transistor which was saturated prior to such next positive pulse is now cut off and the transistor which was then cut off is now saturated. This well known bistable multivibrator action causes a ONE in the form of a negative voltage level to appear at pin 9 whenever transistor T2 is cut off and a ZERO in the form of a negative voltage level to appear at pin 8 whenever transistor T1 is cut off. Similarly, the outputs at 8 and 9 will be at essentially zero or ground potential whenever the respective transistors are saturated. Thus, the counter unit produces a binary count of successive pulses an input pin 7.

As illustrated in FIGURE 4, four of these counter units are utilized as a chain to form the counter 60, which functions to produce a count of $2^4$ or 16. Note that for this utilization only the ZERO output at pin 8 is used and pin 9 is not connected. Similarly, pin 1 as may be seen in FIGURE 6 can be used to set the binary counter unit to a desired initial state, but inasmuch as such is not required in the persent utilization, no connection for this in is shown in FIGURE 4.

FIGURE 7 is in essence a monostable circuit the operation of which is also well known in the art. The circuit is normally in a stable state in which transistor T4 is cut off and transistor T3 is saturated. A positive input pulse on pin 2 or pin 8 of this device causes the circuit to switch to a second cinditionally stable state in which transistor T4 is saturated and transistor T3 is cut off. The circuit remains in this seconnd state for a period of time determined by the time constant of the coupling network between the output of transistor T4 and the input of transistor T3. At the end of this period of time the circuit switches back to its original state.

The output at pin 7 is a positive going pulse whose duration is that of the period of conditional stability. Pin 3 is available for addition of an external capacitor to increase the duration of such output pulse. Note that an external capacitor is not required for this invention, so understandably there is no connection to pin 3 in FIGURE 4. Note also that a complementary output is available at pin 9 of FIGURE 7; however, this output is not needed in the present instance, so no connection is shown in FIGURE 4 to pin 9. Similarly, pin 8 of FIGURE 7 can be used when direct coupling to the input is desired; however, direct coupling is not needed in conjunction with this invention, so no connection is shown in FIGURE 4 to the pins 8.

The following components were found particularly suitable for use in the circuit according to FIGURE 4. It will be understood of course that these components are given merely by way of example, and are not to be considered as limiting the invention:

| Component | | Value |
|---|---|---|
| Diode 2 | | 1N198 |
| Capacitor 30 | picofarads | 470 |
| Transistor 31 | | 2N706 |
| Transistor 33 | | 2N338 |
| Transistor 34 | | 2N338 |
| Transistor 35 | | 2N526 |
| Capacitor 38 | picofarads | 3300 |
| Resistor 39 | ohms | 1000 |
| Diode 44 | | 1N198 |
| Diode 45 | | 1N198 |
| Diode 53 | | 1N198 |
| Resistors of summer 61: | | |
|   Step 1 (Counter 56) | K | 8 |
|   Step 2 (Counter 57) | K | 4 |
|   Step 4 (Counter 58) | K | 2 |
|   Step 8 (Counter 59) | K | 1 |
|   Summing resistor | K | 22 |
| Transistor 63 | | 2N396 |
| Resistor 65 | K | 1 |
| Diode 68 | | 1N198 |
| Diode 69 | | 1N198 |
| Transistor 72 | | 2N396 |
| Resistor 73 | K | 18 |
| Resistor 74 | ohms | 470 |
| Capacitor 75 | microfarads | 0.1 |
| Diode 78 | | 1N198 |
| Capacitor 79 | picofarads | 470 |
| Transistor 82 | | 2N338 |
| Transistor 83 | | 2N338 |
| Transistor 84 | | 2N526 |
| Transistor 94 | | 2N706 |

In FIGURE 4 we described in detail the construction of a staircase waveform generator which was used as the timing wave in this particular embodiment of this invention. However, the linear type timing waveform depicted in FIGGURE 2 may be easily generated by means of well-known electronic devices; for example, the bootstrap sweep circuits described on pages 228–232 of Millman and Taub, "Pulse and Digital Circuits," McGraw-Hill Company, 1956, are satisfactory for use with thermionic vacuum tubes; and bootstrap sweep circuits described on pages 209–214 of Strauss, "Wave Generating and Shaping," McGraw-Hill and Company, 1960, are satisfactory for use with transistors. However, many other circuits well known in the art are equally applicable.

In the embodiment of this invention described in detail herein a number of circuits and techniques were used for convenience, but such particular circuits and techniques do not necessarily limit this invention.

For example, thermionic vacuum tube cathode followers may be used for isolation and impedance matching where such is necessary, and indeed all active circuits can be easily duplicated with well-known vacuum tube circuitry. Similarly, applications with less stringent requirements than were present in the above design can be constructed eliminating several components and circuits included to meet such stringent requirements, such as, for example the emitter followers.

Having thus fully described our invention it is to be understood that various changes in the design of the circuits and in minor details and arrangements of the circuits, may be resorted to without departing from the spirit of the invention, or its scope as claimed herein:

We claim:

1. A demodulator for extracting the intelligence from a stream of pulses that have been position modulated, comprising a storage device for receiving and storing successively each position modulated pulse whenever such pulse arrives, means for measuring the time of arrival of each pulse with respect to a time reference, said means for measuring said time of arrival producing a voltage amplitude proportional to the relative time of arrival of said position modulated pulse, and means for reading out such voltage amplitude at the end of each reference time period.

2. A demodulator which extracts the intelligence from a stream of pulses that have been position modulated comprising a storage device for receiving a position modulated pulse whenever such pulse arrives during a modulation time period, said storage device being empty at the beginning of such a modulation time period, a timing device for measuring the time of arrival of said pulse with respect to a reference based upon the time period, such measurement being in the form of a voltage amplitude proportional to the relative time of arrival of said position modulated pulse, and means for emptying said storage device at the end of such time period.

3. A demodulator for extracting the intelligence from a stream of pulses that have been position modulated comprising a storage device for receiving and storing successively each position modulated pulse arriving, means for measuring the time of arrival of each pulse with respect to a reference time, said means for measuring said time of arrival producing a voltage amplitude proportional to the relative time of arrival of said position-modulated pulse, a succession of such voltage amplitudes being regularly spaced in time and being a reproduction of the transmitted intelligence contained in the position modulated pulses.

4. A demodulator for extracting the intelligence from a stream of pulses that have been positioned modulated, comprising means for receiving and storing position modulated pulses, means including timing means for establishing the time of arrival of each of such pulses with respect to pre-established reference periods by generating a timing wave, said timing means establishing such time of arrival by being arranged to start a new timing wave in response to each pulse of each reference period that is larger than any preceding pulse of the same period, and means for gating out at the end of each reference period a voltage representing the amplitude of the timing wave of said timing means at the end of each reference period, said amplitude being inversely proportional to the time of arrival of the largest pulse in each period.

5. The demodulator as defined in claim 4 including storage means for receiving the voltage outputs of successive equal reference periods so as to reproduce, by a succession of such voltage levels, the transmitted intelligence contained in the position modulated pulses.

6. The demodulator as defined in claim 5 in which means are provided for emptying at the end of each reference period, both the means for receiving position modulated pulses and the voltage outputs of successive reference periods preparatory to receiving the pulses and voltage outputs representative of subsequent reference periods.

7. The demodulator as defined in claim 4 wherein said timing means for establishing the time of arrival of each pulse with respect to pre-established reference period generates a linearly increasing timing wave, said timing wave producing a continuum of output voltage values for reproduction of continuous pulse position modulated signals.

8. The demodulator as defined in claim 4 wherein said timing means for establishing the time of arrival of each pulse with respect to pre-established reference period generates a linearly increasing timing wave, said timing wave producing a continuum of output voltage values containing the discrete voltages required for reproduction of quantized pulse position modulation signals.

9. The demodulator as defined in claim 4 wherein said timing means for establishing the time of arrival of each pulse with respect to pre-established reference period generates a staircase waveform with an integral number of discrete uniform voltage steps during each said reference time period, said timing wave producing an integral number of discrete output voltage steps for reproduction of quantized pulse position modulated signals.

10. The demodulator as defined in claim 5 wherein said timing means for establishing the time of arrival of each pulse with respect to pre-established reference period generates a staircase waveform with an integral number of discrete uniform voltage steps during each said reference time period, said timing wave producing an integral number of discrete output voltage steps for reproduction of continuous pulse position modulated signals where such reproduction is required to be quantized in amplitude.

11. In a pulse signalling system using pulse position modulation, said system having means for rejecting noise and interfering crosstalk pulses associated with said pulse signalling systems where such noise and interfering crosstalk pulses contain less energy than the correct pulse, said system comprising means for accepting and storing the first pulse arriving during a given time period, latter means accepting and storing each pulse subsequently arriving during said given time period that has a higher probability, by virtue of a higher amplitude, of being the correct pulse than other pulses arriving earlier in the time period, said means also disregarding such previously accepted and stored pulses arriving during the time period, said means also rejecting false pulses arriving in the time period subsequent to the arrival of the correct pulse, means for determining the time of arrival of said correct pulse with reference to the beginning of the time period, means for converting said time of arrival to a voltage amplitude proportional to said time of arrival of said correct pulse, means for storing said output voltage amplitudes for a succession of time periods, means for reading out the sequence of stored voltages whose amplitudes are proportional to the time of arrival of the correct pulses in each succeeding time period, said sequence of output voltages being a sampled reproduction of the original signal, free from noise and distortion due to noise and interfering crosstalk pulses associated with pulse signalling system, and means for discharging the input and output storage at the end of each time period.

12. The pulse signalling system as defined in claim 11 in which said means for determining the time of arrival of said correct pulse with reference to the beginning of a time period generates a linearly increasing timing wave, said timing wave being initiated at the exact time of acceptance and storage of a pulse, said timing wave being reinitiated as each successive acceptance and storage of a pulse occurs, thus achieving an amplitude at the end of a complete time period proportional to the time of arrival of the last and most probably correct pulse, said timing wave thus producing a continuum of output voltage values for reproduction of continuous pulse position modulated signals and quantized pulse position modulated signals.

13. The pulse signalling system as defined in claim 11 in which said means for determining the time of arrival of said correct pulse with reference to the beginning of a time period generates a staircase waveform timing wave, said timing wave being initiated at the exact time of acceptance and storage of a pulse, said timing wave being reinitiated as each successive acceptance and storage of a pulse occurs, thus achieving an amplitude at the end of a complete time period proportional to the time of arrival of the last and most probably correct pulse, said timing wave thus producing an integral number of discrete output voltage steps for reproduction of quantized pulse position modulation signals and for reproduction of continuous pulse position modulated signals where such reproduction is required to be quantized in amplitude.

14. A demodulator for extracting intelligence from a stream of pulses that have been position modulated comprising means for receiving and temporarily storing position modulated pulses, means for establishing the time of arrival of intelligence bearing pulses with respect to pre-established reference periods, latter means including means for creating, during each reference period, a timing wave commencing in response to each received pulse that is larger than any other preceding pulse of the same period, and means for gating out an amplitude at the end of each reference period that is inversely proportional to the time of arrival of such largest pulse receiving during that reference period.

References Cited by the Examiner

UNITED STATES PATENTS

| | | | |
|---|---|---|---|
| 2,591,842 | 4/52 | Llewellyn | 328—151 X |
| 2,852,607 | 9/58 | Treadwell | 328—151 X |
| 2,891,154 | 6/59 | Holmes | 329—107 |
| 3,142,806 | 7/64 | Fernandez | 329—107 |

ROY LAKE, *Primary Examiner.*